(12) United States Patent
Perumalla et al.

(10) Patent No.: US 12,293,323 B2
(45) Date of Patent: May 6, 2025

(54) AUTONOMOUS LOADING AND UNLOADING OF PACKAGES RELATING TO A VEHICLE

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Venkata Ratnam Alubelli, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/929,158

(22) Filed: Sep. 1, 2022

(65) Prior Publication Data

US 2024/0078498 A1    Mar. 7, 2024

(51) Int. Cl.
  *G06Q 10/08*    (2024.01)
  *G06Q 10/083*   (2023.01)

(52) U.S. Cl.
  CPC ................................ *G06Q 10/083* (2013.01)

(58) Field of Classification Search
  None
  See application file for complete search history.

(56) References Cited

U.S. PATENT DOCUMENTS

| | | | | |
|---|---|---|---|---|
| 2011/0123309 A1* | 5/2011 | Berdelle-Hilge | ....... | B60L 53/80 |
| | | | | 414/800 |
| 2014/0262690 A1* | 9/2014 | Henderson | ............ | B60M 1/346 |
| | | | | 198/602 |

(Continued)

FOREIGN PATENT DOCUMENTS

| | | |
|---|---|---|
| CN | 210757692 U | 6/2020 |
| DE | 102014223031 B4 | 7/2020 |

(Continued)

OTHER PUBLICATIONS

Ulmer, Martin W., and Sebastian Streng, "Same-day delivery with pickup stations and autonomous vehicles," Aug. 2019, Computers & Operations Research, vol. 108, pp. 1-19 (Year: 2019).*

(Continued)

*Primary Examiner* — Daniel Vetter
*Assistant Examiner* — Christopher Gomez
(74) *Attorney, Agent, or Firm* — Monchai Chuaychoo

(57) ABSTRACT

An approach for routing one or more packages and delivering the one or more packages to one or more autonomous vehicles is disclosed. The approach receives shipment request from the one or more vendors, receives package status (e.g., status that the one or more packages is ready to be routed, dimension and weight of the one or more packages) of the one or more packages from the one or more vendors, receives vehicle status (e.g., size and available storage space in the vehicles, location and transit time of the vehicles) from the one or more autonomous vehicles. The approach receives the status of the delivery units (e.g., available automated delivery unit, current path and time of completion). The approach determines an optimal routing path for the one or more packages based on the shipment request, package status and vehicle status and outputs the optimal routing path.

19 Claims, 6 Drawing Sheets

(56) References Cited

U.S. PATENT DOCUMENTS

| | | | |
|---|---|---|---|
| 2015/0006005 A1* | 1/2015 | Yu | G05D 1/667 |
| | | | 701/22 |
| 2015/0227888 A1* | 8/2015 | Levanon | G06Q 10/0834 |
| | | | 705/334 |
| 2016/0368464 A1* | 12/2016 | Hassounah | B60L 53/80 |
| 2018/0024554 A1* | 1/2018 | Brady | G06Q 10/0833 |
| | | | 701/23 |
| 2019/0047801 A1 | 2/2019 | Pinilla Pico | |
| 2019/0085614 A1 | 3/2019 | Chia | |
| 2019/0333390 A1 | 10/2019 | Woodrow | |
| 2022/0212638 A1* | 7/2022 | Georgeson | G05D 1/12 |
| 2023/0278456 A1* | 9/2023 | Saliga | B60L 53/36 |
| | | | 29/730 |
| 2024/0144177 A1* | 5/2024 | Davies | G06Q 10/087 |

FOREIGN PATENT DOCUMENTS

| | | |
|---|---|---|
| WO | 2018024852 A1 | 2/2018 |
| WO | 2020249331 A1 | 12/2020 |

OTHER PUBLICATIONS

"Method and System for External Robotic Arm of Vehicle", An IP.com Prior Art Database Technical Disclosure, Authors et al.: Disclosed Anonymously, IP.com No. IPCOM000269429D, IP.com Electronic Publication Date: Apr. 17, 2022, 3 pages.

\* cited by examiner

AUTONOMOUS LOADING AND UNLOADING OF PACKAGES RELATING TO A VEHICLE

BACKGROUND

The present invention relates generally to autonomous vehicle, and more particularly loading and unloading of packages related to the autonomous vehicle.

Autonomous vehicle becoming more prevalent in transportation function of daily life, including traveling to/from work, leisure travel and shopping. There are items (e.g., packages, etc.) that are stored in the autonomous vehicle that needs to be retrieved or loaded at the beginning or the end of a trip. Items can be loaded/unloaded with robotic assistance or manually (i.e., human interaction).

SUMMARY

Aspects of the present invention disclose a computer-implemented method, a system and computer program product for routing one or more packages and delivering the one or more packages into one or more storage space belonging to one or more autonomous vehicles from a location of the one or more vendors. The computer implemented method may be implemented by one or more computer processors and may include: receiving shipment request from the one or more vendors; receiving package status of the one or more packages from the one or more vendors; receiving automated delivery unit status; receiving vehicle status from the one or more autonomous vehicles; determining an optimal routing path for the one or more packages based on the shipment request, package status, delivery unit status and vehicle status; and outputting the optimal routing path.

According to another embodiment of the present invention, there is provided a computer system. The system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
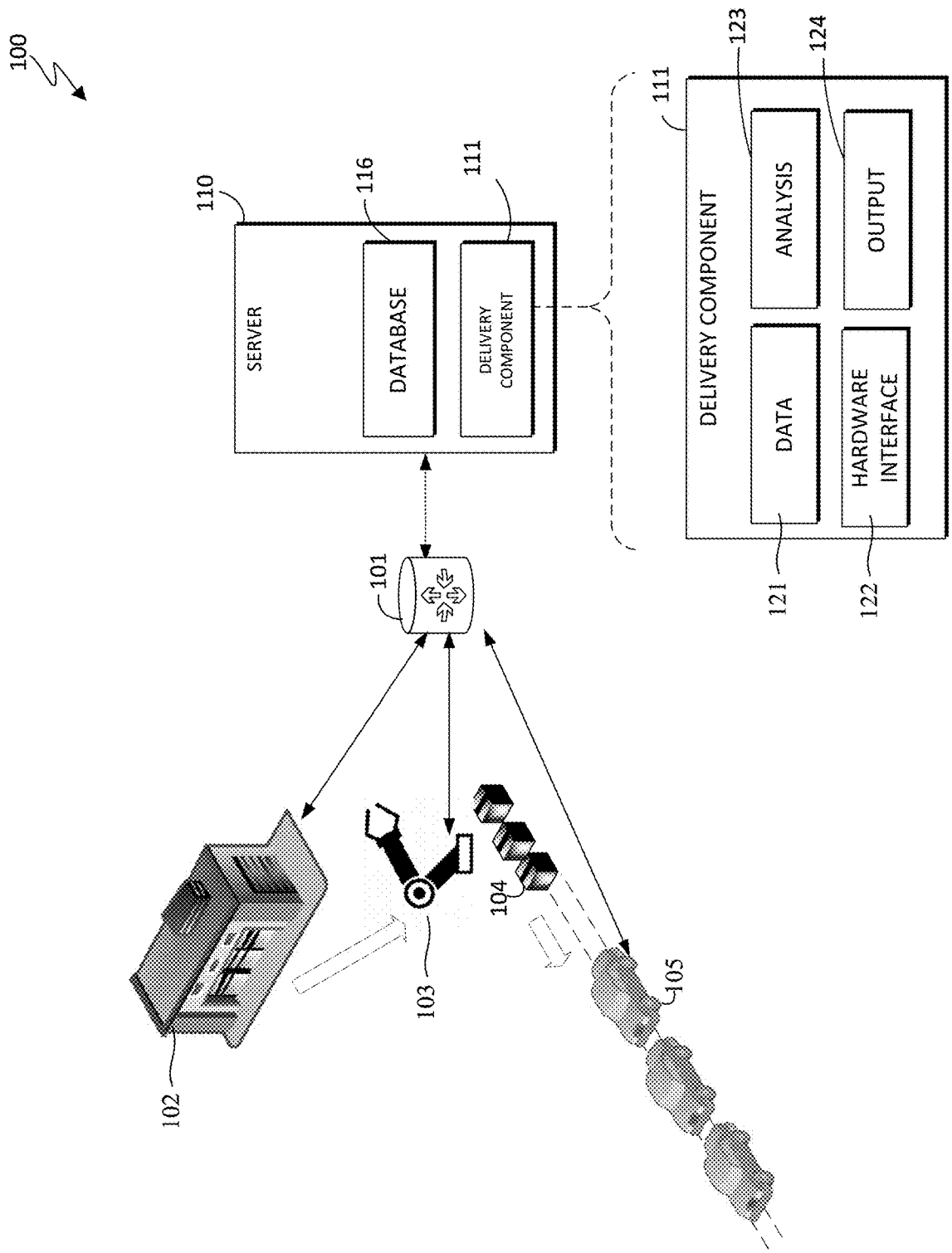
FIG. 1 is a functional block diagram illustrating a high-level overview of the delivery environment, designated as 100, in accordance with an embodiment of the present invention.

There are items (e.g., packages, grocery, etc.) that are stored in the autonomous vehicle that needs to be retrieved or loaded for various reasons (e.g., end of trip, beginning of trip, dropping of mail, etc.). Those items can be loaded/unloaded with robotic assistance or manually (i.e., human interaction).

There are existing methods to load/unload items from a vehicle using robotic assistance. However, those can be cumbersome and time consuming, specifically if they are several users with vehicles that are waiting for packages to arrive after shopping at a physical location (or placed an online order).

Embodiments of the present invention presents an approach to overcome existing difficulties with loading items in and out of the vehicle. One approach leverage assembly line style of moving packages from the store (e.g., grocery, warehouse, shopping stores, etc.) via an automated delivery system to the location of the parked vehicles. The park vehicles are arranged in a uni-direction overlaying on top of existing channels/rails (see FIG. 1). The automated delivery unit (see 202 of FIG. 2) can load the packages from bottom, top or rear into cargo compartment of the vehicle.

One configuration of the approach involves a modified boot (e.g., empty trunks space, either front or rear, etc.) of a vehicle that works in tandem with an automated package delivery system. For example, (see FIG. 3A and FIG. 3B), the modified boot, allows for loading and unloading from the bottom of the vehicle. The boot space of can be opened from the bottom side (i.e., underneath) of the vehicle by a sliding door (with auto-locking and unlocking platform) or a swinging door (depending on car configuration).

In some embodiments, inside the boot space of autonomous vehicle, there can be an robotic arm to, i) arrange the received packages from the bottom side the boot space and ii) place the packages properly inside the boot space, so that the packages received from the bottom side arranged properly.

In some embodiments, at the product pickup zone of retail store, the autonomous vehicle and the automated delivery system can collaborate with each other and accordingly the automated delivery system can move at the bottom side of the autonomous vehicle to load the packages inside the autonomous vehicle. Furthermore, if there are more than one autonomous vehicles, embodiment can instruct all vehicles (awaiting pickup based on the package status/availability) to arrange in a certain order (aligned) to the route of automated delivery system so that time to load is minimized.

It is to be understood that the term, "boot space", "trunk", "boot", "cargo" and "storage" can be used interchangeably through this disclosure and conveys the same meaning.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a delivery environment 100 in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Delivery environment 100 includes network 101, building 102, autonomous delivery system 103, packages 104, autonomous vehicle 105 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, building 102, autonomous delivery system 103, packages 104 and autonomous vehicle 105 and other computing devices (not shown) within delivery environment 100. It is noted that other computing devices can include, but is not limited to, autonomous vehicle 105 and any electromechanical devices capable of carrying out a series of computing instructions.

Building 102 is a location where packages (e.g., items, etc.) are stored, for example, a shopping store, grocery store and warehouse. Building has a network connection to server 110.

Autonomous delivery system 103 is a system capable of retrieving, delivering and loading packages into a vehicle. In one embodiment, (see FIG. 2A), autonomous delivery system 103 can include robotic arms traveling along an overhead path above a parking surface that can lower the packages into the trunk of awaiting vehicles.

It is noted that autonomous delivery system can include several "units" of similar equipment since each delivery "unit" can service one vehicle at a time. Thus, there can be more than one "automated delivery units" (see 202 of FIG. 2) for autonomous delivery system 103. It is further noted that automated delivery units can include groups of overhead units and groups of ground automated delivery units as part of autonomous delivery system 103. Each automated delivery unit has self-mobility capability and can move independently from other units along the path (assuming the path has space for two way traffic).

In another embodiment (see FIG. 2B), autonomous delivery system 103 can include moveable/roll able platform along a path/tunnel underneath a parking surface that can be raised up and down. The platform can be equipped with a robotic arm.

Packages 104 are items that users have purchased and/or received from building 102. Packages 104 have smart tracking capability wherein the location and status ( ) can be ascertain within the delivery environment. For example, user_1 placed an order for a dozen can of sodas from the grocery store (i.e., building 102). The dozen can of sodas are placed (from the shelve) into a package, which can be tracked as to its availability (i.e., order fulfilled?).

Autonomous vehicle 105 are vehicles with full-self driving capabilities. The vehicles may contain two or more wheels as a means of propulsion. Autonomous vehicle 105 can contain one or more cargo storage compartments (e.g., front, rear, etc.).

The front and/or rear storage (i.e., boot space) compartment can contain be modified to accept loading/unloading of packages from the bottom (underneath) of the vehicle. Boot space of autonomous vehicle can be opened (e.g., sliding mechanism or swing type, etc.) from bottom side of the vehicle, with auto-locking and unlocking platform. The platform is attached to the autonomous vehicle chassis, where can be opened to create passage for packages to keep inside the vehicle boot space, and upon loading, the siding platform will be closed and will be auto locked. Furthermore, in some embodiment, there exist a robotic arm (inside the cargo area) that serves to re-arrange packages inside the storage area.

In some embodiments, the total storage space can be adjustable due to motorized doors that can segregate or open compartments. This space can be adjusted as per the size/weight of package. This adjustment can also be done based on the distance of delivery of package. For example, the nearest delivery package can be kept handy to reduce time for retrieval by passenger/user.

In some embodiments, autonomous vehicle 105 does not have a modified boot space and can accept packages from the "normal" configuration (i.e., trunk opening from the top).

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within Delivery environment 100 via network 101. In another embodiment, server 110 represents a computing system utilizing clustered computers and components (e.g., database server computers, application server computers, etc.) that act as a single pool of seamless resources when accessed within Delivery environment 100.

Embodiment of the present invention can reside on server 110. Server 110 includes delivery component 111 and database 116.

Delivery component 111 provides the capability of organizing and managing delivery of packages from building 102 into autonomous vehicle 105. This can include collaborating with the autonomous vehicles to identify the arrival time of the autonomous vehicles at the pickup point along with package availability status, and accordingly, the autonomous vehicles cab be sequenced (i.e., instructed) in regards on where and how to park to receive the package.

In the depicted embodiment, delivery component 111 includes data subcomponent 121, hardware interface subcomponent 122, analysis subcomponent 123 and plan output subcomponent 124.

As is further described herein below, data subcomponent 121 of the present invention provides the capability of retrieving various data, such as, but is not limited to, vehicle status (e.g., vehicle location, vehicle storage compartment availability, location and transit time of the one or more autonomous vehicle to location of the one or more vendors, etc.), shipment request (e.g., items to be placed into one or more packages including dimension and weight of items, availability of items at the location of the one or more vendors, etc.), package dimension, package weight, location of package, the status of each automated delivery unit (e.g., available automated delivery unit, current path and time of completion of other unavailable automated delivery unit, location of available automated delivery unit and type of available automated delivery unit).

As is further described herein below, hardware interface subcomponent 122 of the present invention provides the capability of communicating and instructing various devices (e.g., packages, autonomous vehicle, robotic arms, etc.) to perform various functions. Hardware interface subcomponent 122 contains libraries of software routines (e.g., functions, APIs) that can easily interface and control various devices from different manufacturer. Thus, different components that makes up a robotic arm can be coupled to a motorized platform (from another vendor) and all instructions/commands (sent to the automated delivery unit) will be seamless.

As is further described herein below, analysis subcomponent 123, receiving information via data subcomponent 121, of the present invention provides the capability of developing and creating delivery plan/solutions (i.e., optimal routing path). Analysis subcomponent 123 can leverage machine learning or AI (artificial intelligence) to perform scenario and prediction calculations to determine the optimal routing path(s). Any existing machine learning techniques can be used to teach analysis subcomponent 123 to independently calculate the optimal path. A predetermined configuration (by the user) may be initially used as a baseline before analysis subcomponent 123 can learn to be more efficient.

The delivery plan and solutions can be based on the following, but it is not limited to, determines which autonomous vehicle(s) (i.e., arriving to pick up a package) should park, which package(s) via which automated delivery unit(s) should deliver that package to which vehicle(s), where should subsequent vehicles park. Thus, one delivery plan can include arranging vehicle_1 to park in front of the specialized parking space (containing automated delivery system 103) and arranging vehicle_2 to park behind vehicle_1. It has determined that using delivery_unit_3 (from overhead rail system #2) is the most efficient route for package_1 (for vehicle_1) from store_1 to the vehicle.

Other instructions, calculated by analysis subcomponent 123, can include the following: i) aligning the vehicle and automated delivery unit at the pickup zone of the shopping store, vehicle can move over a channel, ii) identifying the number of vehicles will be arriving and respective automated delivery unit for each and every vehicle, ii) be proactively, arranged the automated delivery unit around the appropriate pickup zone of the retail store, iii) vertically aligning automated delivery unit and the vehicles will be parked and iv) authenticating between the vehicle and the automated delivery unit to each other and can recognize the respective automated delivery unit.

As part of the optimal routing path, analysis subcomponent 123 could even determined how many packages that were ordered would fit in the vehicle (before the autonomous vehicle arrives to building 102). For example, embodiment can analyze package size, so that it can determine which packages would fit into which compartment of the vehicle depending on the available boot space, and the opening area from the bottom of the vehicle.

As is further described herein below, output subcomponent 124 of the present invention provides the capability of executing solutions or plans developed by analysis subcomponent 123. For example, based on the previously mentioned plan above, output subcomponent 124 can instruct vehicle_1 to park in front of the specialized parking space (containing automated delivery system 103) and instruct vehicle_2 to park behind vehicle_1. It would then route package_1 (for vehicle_1) from store_1 to the vehicle using delivery_unit_3 (via overhead rail system #2).

It can even control the robotic arm (either inside the vehicle or on the delivery platform) to arrange the packages in an optimal space and efficiently (reduce time). For example, inside the boot space, there will be adjustable compartments which can be adjusted as per need basis. Robotic arm can arrange the compartments considering the size/weight of package and even place of delivery (i.e., nearest delivery packages can be kept handy and so on).

Database 116 is a repository for data used by delivery component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within Delivery environment 100, provided that Delivery component 111 has access to database 116. Database 116 may store information associated with, but is not limited to, knowledge corpus relating to, weather forecast, traffic pattern, road conditions, location of all autonomous vehicles, locations of all passengers (e.g., on a ride, waiting for a ride, exiting, etc.), health conditions of all autonomous vehicles, travel routes, package status (e.g., status that the one or more packages is ready to be routed, dimension and weight of the one or more packages, status that the one or more packages is not ready), vendor package status, and demands for each locations.

Figure 2A:
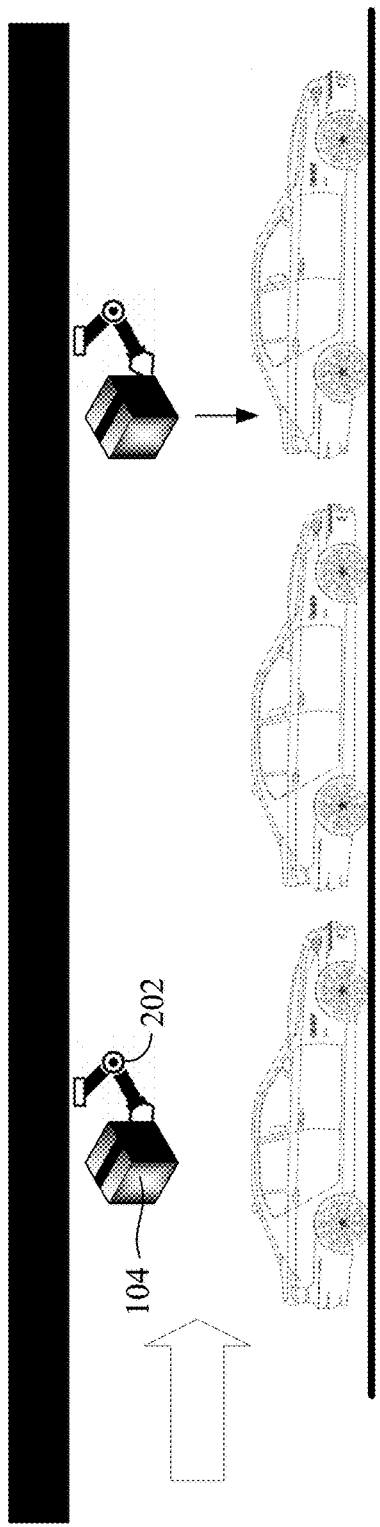
FIG. 2A is a functional block diagram illustrating the delivery system configuration to load packages into a line of vehicles, wherein there are overhead rail system and floor delivery system in accordance with an embodiment of the present invention.

FIG. 2A is a functional block diagram illustrating different delivery system configuration to load packages into a line of vehicles, wherein there is an overhead rail system in accordance with an embodiment of the present invention. Package are carried and loaded by delivery unit from above the parked or slightly moving vehicles. This configuration does not require a modified boot for the vehicle.

Figure 2B:
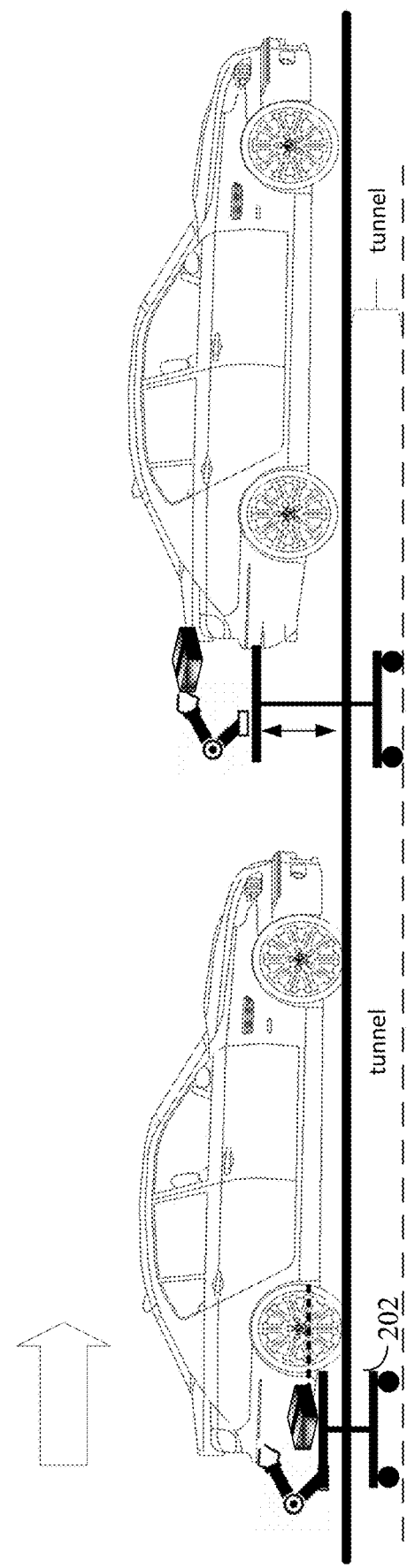
FIG. 2B is a functional block diagram illustrating the floor delivery system on how packages can be loaded into the vehicles (e.g., bottom trunk or from the rear), in accordance with an embodiment of the present invention.

FIG. 2B is a functional block diagram illustrating the floor delivery system on how packages can be loaded into the vehicles (e.g., bottom trunk or from the rear), in accordance with an embodiment of the present invention. For a floor-based delivery system, the automated delivery units can have motorized wheels to propel it along the floor, underneath the vehicles. As previous mentioned, automated delivery units can have a motorized platform that can raise packages from the level of the path up to the bottom boot of the vehicle (i.e., bottom boot loading). This configuration requires the autonomous vehicle to have a modified boot (with a bottom opening).

In some embodiments, automated delivery unit (either floor-based or ceiling-based) can load packages into the normal trunk (unmodified boot).

Figure 2C:
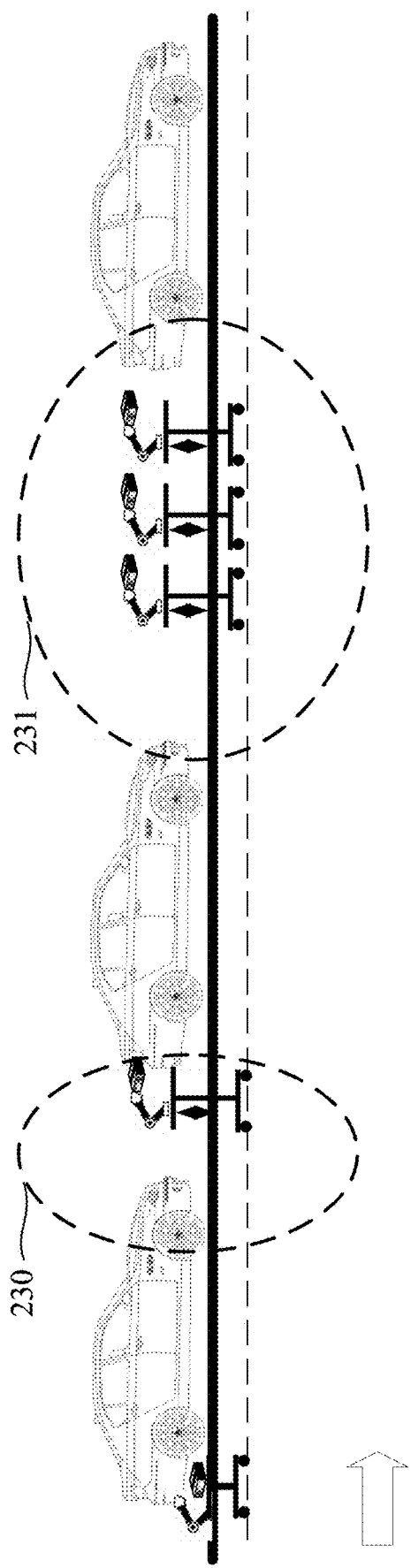
FIG. 2C is a functional block diagram illustrating the floor delivery system on how gaps (e.g., small versus large gap) between vehicles can be handled by automated delivery units, in accordance with another embodiment of the present invention.

FIG. 2C is a functional block diagram illustrating the floor delivery system on how gaps (e.g., small versus large gap) between vehicles can be handled by automated delivery units. For example, different vehicles can have different length and varying trunk space. For narrow space (i.e., small gap 230) between vehicles, it may become difficult to deliver packages. However, automated delivery unit 202 is capable of squeezing in between spaces to delivery the package and if it is not able to squeeze then delivery component 111 may instruct vehicles to realign (e.g., move forward and/or backward) to accommodate the package.

If there are multiple and oversize packages to be loaded into a vehicle, more space may be required between vehicles (i.e., large gap 231). Thus, delivery component 111 may instruct vehicles to realign (e.g., move forward and/or backward) to accommodate large and multiple packages. It is noted that one automated delivery unit may not be adequate to carry multiple packages in the above scenario and may require several automated delivery units.

Figure 3A:
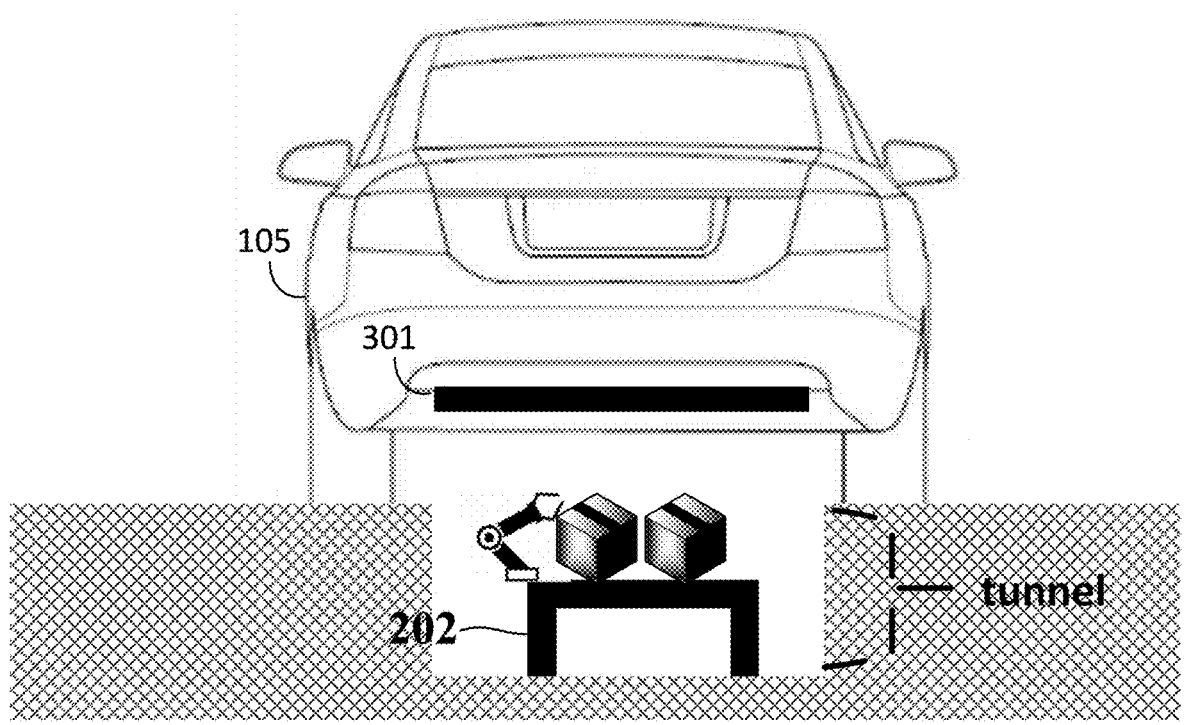
FIG. 3A is a functional block diagram illustrating a more detailed on how packages can be loaded into the vehicles from the bottom via floor delivery system, wherein the boot lid (301) is in the closed position, in accordance with an embodiment of the present invention.
Figure 3B:
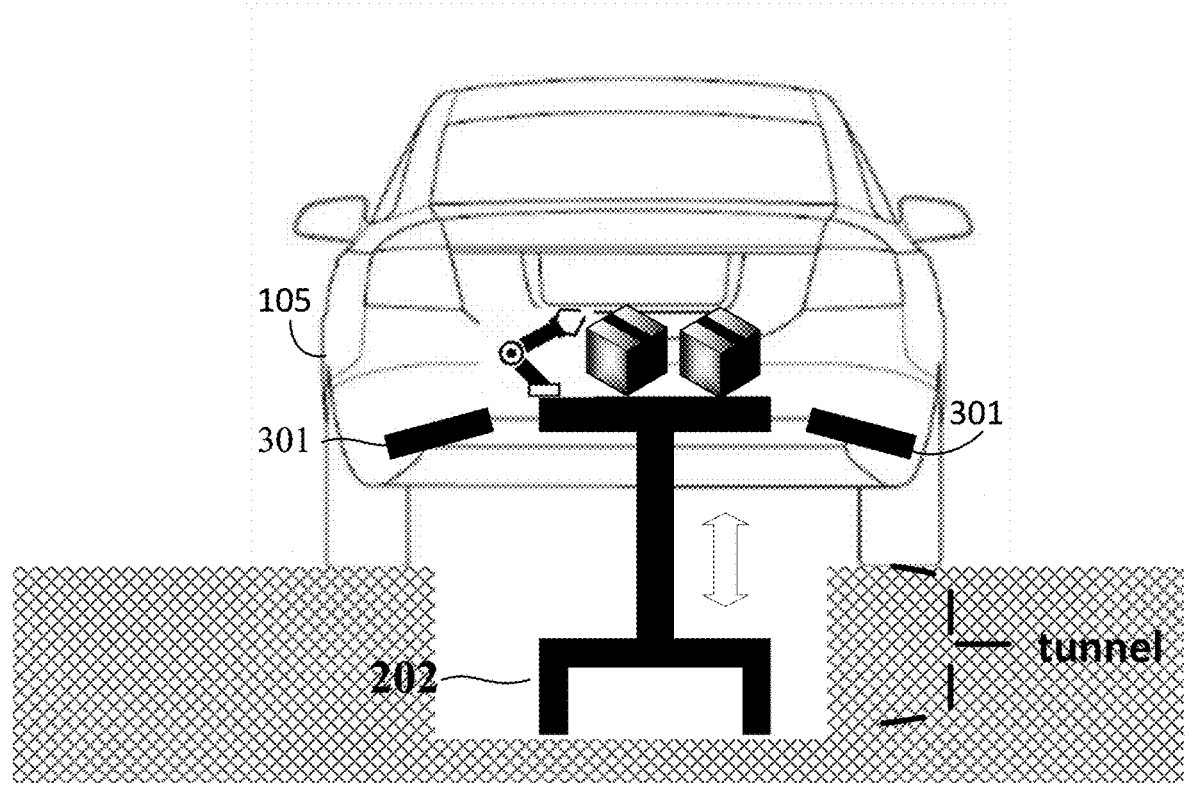
FIG. 3B is a functional block diagram illustrating how the package can be loaded from the bottom with an open boot lid (301) inside the vehicle, in accordance with an embodiment of the present invention.

FIG. 3A is a functional block diagram illustrating a more detailed on how packages can be loaded into the vehicles from the bottom via floor delivery system. FIG. 3A shows boot lid (301) is in the closed position as the automated delivery unit is positioning itself with packages underneath the vehicle. FIG. 3B is a functional block diagram illustrating how the package can be loaded from the bottom once boot lid (301) is opened (e.g., sliding or swing type).

Figure 4:
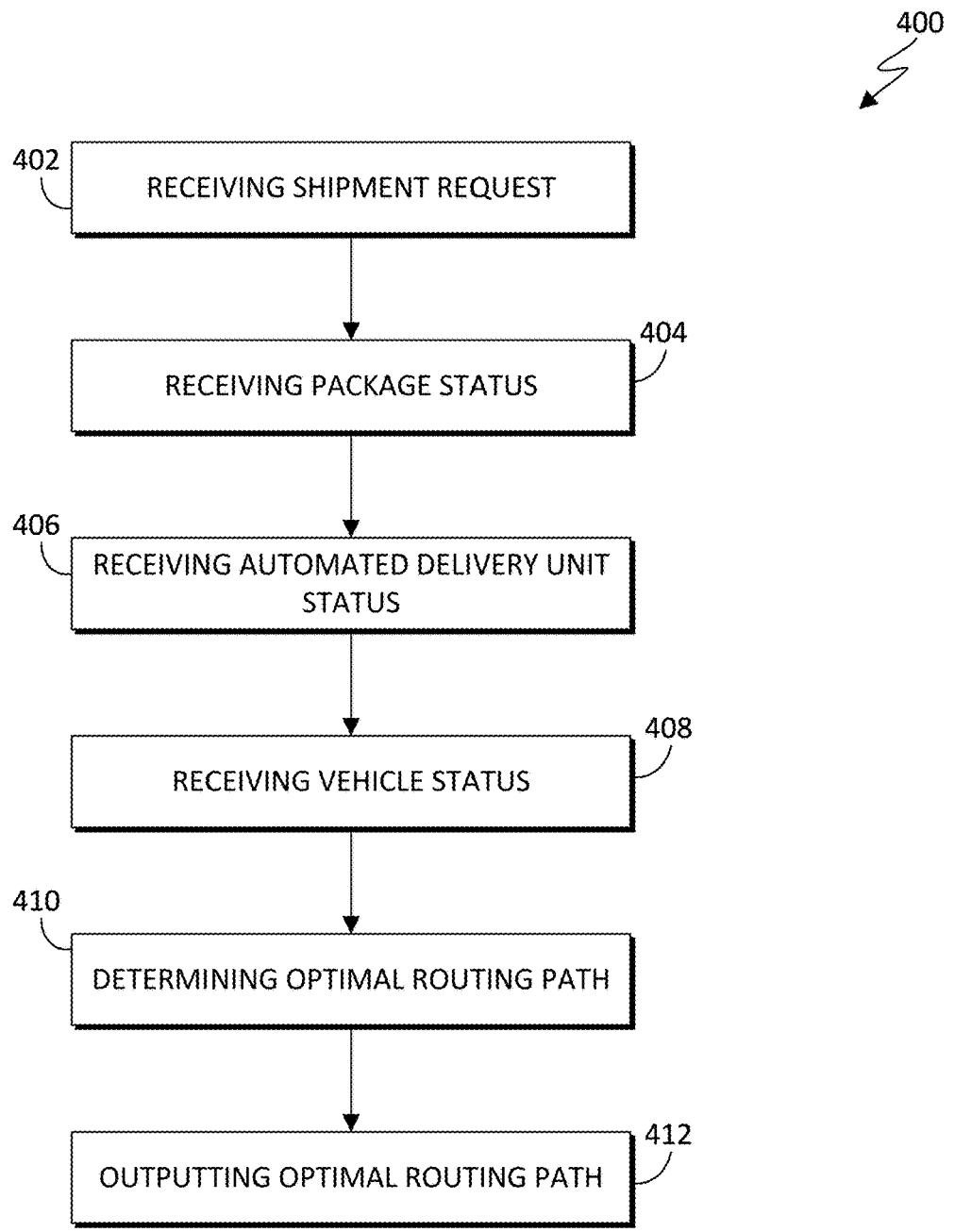
FIG. 4 is a high-level flowchart illustrating the operation of delivery component 111, designated as 400, in accordance with an embodiment of the present invention.

FIG. 4 is a flowchart illustrating the operation of delivery component 111, designated as 400, in accordance with another embodiment of the present invention. A user case example is provided to accompany the steps. Client_1 is at home and noticed that his soda is low and orders a six pack of soda from the grocery store for a pickup. Client_1 sends his autonomous vehicle, (vehicle_1) to the grocery store to pickup the six pack of soda. Unbeknownst to client_1, other clients (e.g., client_2 and client_3) also requires other items from the same grocery store and have either rode or sent their vehicles (e.g., vehicle_2, vehicle_3) to the same store and around the same time as well. The same grocery store has a specialized parking area (i.e., designated as pickup only) with a modified "tunnel" (see FIGS. 2B and 3A-3B) that allows automated delivery units to travel from the grocery store to the parked vehicles. This grocery store is a medium size store and can handle 100 clients inside at a time and thus, there is only one automated delivery system 103 (i.e., one tunnel with 20 automated delivery units 202). It is noted that in a busy and larger store, there can be multiple automated delivery system using one or more tunnels and one or more overhead configuration. Each tunnels (depending on the length) can accommodate 10+ automated delivery units. Thus, it is possible to have 50+ automated delivery units, spread out amongst the automated delivery system.

Delivery component 111 receives shipment request (step 402). In an embodiment, delivery component 111, through data subcomponent 121, receives shipment request. Recall that shipment request can include, the following, items to be placed into one or more packages including dimension and weight of items, availability of items at the location of the one or more vendors, etc. The shipment request is initiated by the customer where the customer can specify the vehicle detail to collect the packages from the retail store to delivery component 111. This information (specific vehicle of the customer) can be used by vendor (i.e., store) to identify the vehicle specification, that includes, the opening passage of the boot space, available space and etc.

Using the prior scenario, the grocery store receives request for six pack of soda (designated as package_1) from client_1 but is not ready for pickup yet (it will take 10 mins to be picked off the shelf due to other demands). Client_2 and client_3 requests various items, designated as package_2 and package_3, respectively.

Delivery component 111 receives package status (step 404). In an embodiment, delivery component 111, through data subcomponent 121, receives the package status from the vendor. Recall that package status can include the following information, but it is not limited to, status that the one or more packages is ready to be routed, dimension and weight of the one or more packages, status that the one or more packages is not ready (i.e., vendor has not picked off the shelf/location to be picked up by automated delivery unit).

Using the continuing scenario, the grocery store is able to send delivery_unit_3 (i.e., only unit available to pick up from the shelf) to pick the six pack of soda from the shelf of the grocery store. Thus, the package status is that it is ready to be picked up (i.e., available). Depending on the estimated arrival time of vehicle_1, the six pack of soda (i.e., package_1) may go to awaiting area by the store's loading/unloading area or may go directly to vehicle_1 (if it has already arrived). Other items, package_2 and package_3 is also ready to be picked up.

Delivery component 111 receives automated delivery unit status (step 406). In an embodiment, delivery component 111, through data subcomponent 121, receives automated delivery unit status, which can include, but it is not limited to, available automated delivery unit, current path and time of completion of other unavailable automated delivery unit, location of available automated delivery unit and type of available automated delivery unit.

Using the continuing scenario, delivery_unit_5 (out of all 20 units) is available at that moment in time, assuming from step 404 that the six pack of soda (package_1) is waiting on the loading/unloading area because vehicle_1 has not arrived to the store yet. At the same time, package_2 and package_3 is being pick up from the shelves by delivery_unit_1 and delivery_unit_10).

Delivery component 111 receives vehicle status (step 408). In an embodiment, delivery component 111, through data subcomponent 121, receives the following data, vehicle location, vehicle storage compartment availability (e.g., available spaces inside the boot space or space partially occupied by other products/items/packages), location and transit time of the one or more autonomous vehicle to location of the one or more vendors, etc.

Using our continuing scenario, the status of vehicle_1 is that it has not arrived to the store yet and will be arriving in 10 minutes. Similarly, vehicle_2 and vehicle_3 will be arriving earlier than vehicle_1 by a few minutes.

Delivery component 111 determines optimal routing path (step 410). In an embodiment, delivery component 111, through analysis subcomponent 123, can determine the shortest path and/or time-efficient path for items to be delivered to the one or more autonomous vehicles, utilizing several routes and automated delivery units.

Using the continuing scenario and based on the various real time data of, 1) package status (e.g., package_1 is at the loading dock, package_2, package_3), 2) vehicle status (status of vehicle_1, vehicle_2 and vehicle_3), 3) automated delivery unit status (i.e., delivery_unit_3 and delivery_unit_5 are available), delivery component 111 can determine the optimal routing path. One routing path can include, arranging vehicle_1 to park in front of vehicle_2 and vehicle_3 (i.e., vehicle_2 and vehicle_3 arrived ahead of vehicle_1) and use delivery_unit_3 to deliver package_1 to vehicle_1. Furthermore, current routing path can direct delivery_unit_5 to retrieve package_2 and package_3 from the store. Once, delivery_unit_3 has finished delivery package_1 to vehicle_1 then delivery_unit_3 can pick up (handed of from another delivery unit) package_2 from delivery_unit_3 for vehicle_2 while delivery_unit_5 delivers package_3 for vehicle_3. The above is one example of one permutation but there are many possible permutations that can arise based on number of packages ready, status of all inbound vehicles, status of automated delivery units.

Delivery component 111 outputs optimal routing path (step 412). In an embodiment, delivery component 111, through output subcomponent 124, executes the optimal routing path. The execution is done via a combination of automated delivery units, coordinating parking of vehicles and ultimately delivering the packages into the vehicles with the most efficiency and time.

Using the continuing scenario and then routing path (from step 410) can include, instructing (delivery component 111 via hardware interface subcomponent 122) to arrange vehicle_1 to park in front of vehicle_2 and vehicle_3 and instructing delivery_unit_3 to deliver package_1 to vehicle_1. In addition, based on the rest of the optimal path (from step 410), delivery component 111 can instruct delivery_unit_5 to retrieve package_2 and package_3 from the store. Once, delivery_unit_3 has finished delivery package_1 to vehicle_1 then delivery_unit_3 can pick up (handed of) package_2 from delivery_unit_3 for vehicle_2 while delivery_unit_5 delivers package_3 for vehicle_3.

Figure 5:
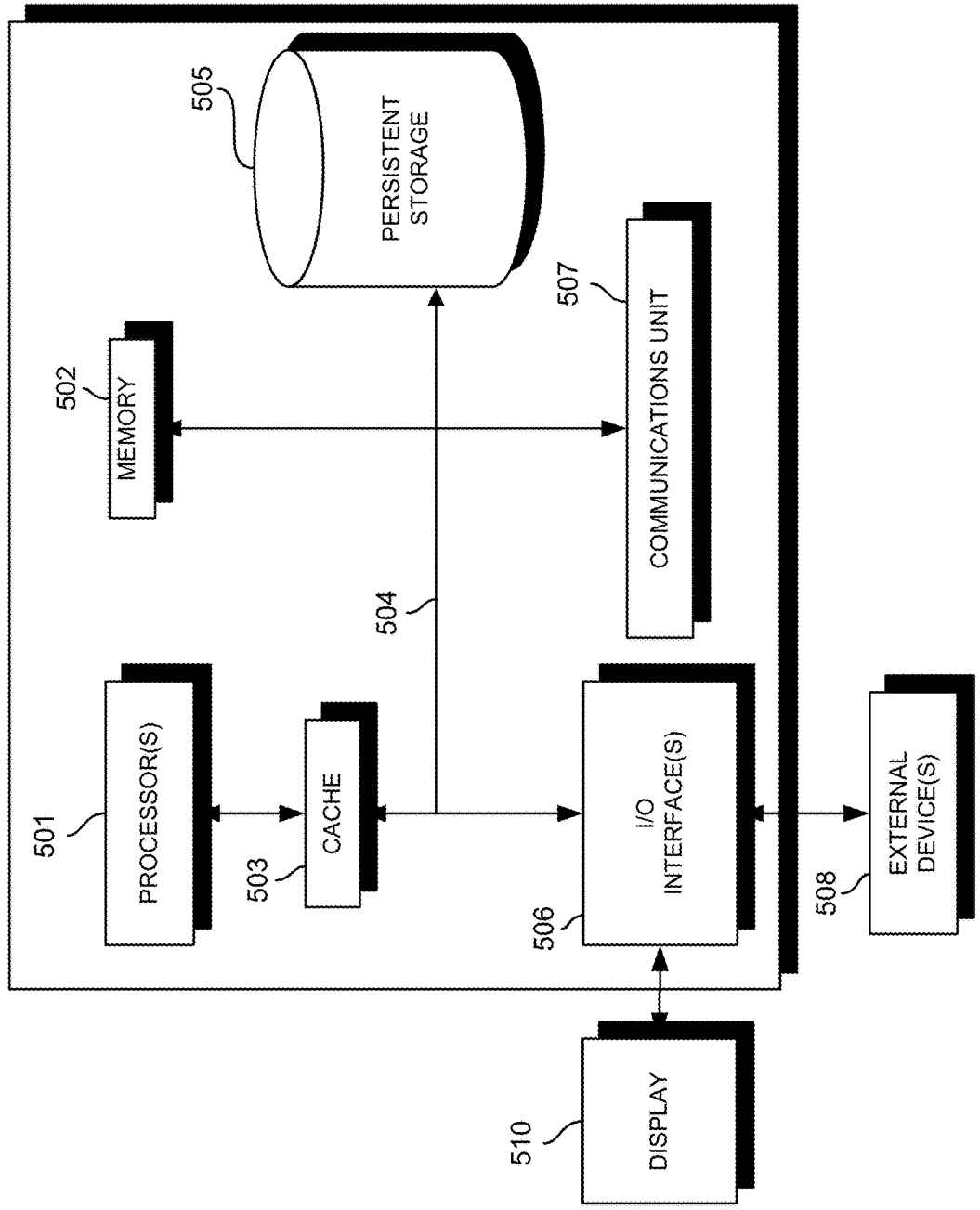
FIG. 5 depicts a block diagram, designated as 400, of components of a server computer capable of executing the delivery component 111 within the delivery environment 100, in accordance with an embodiment of the present invention.

FIG. 5, designated as 500, depicts a block diagram of components of delivery component 111 application, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data x10) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Delivery component 111 can be stored in persistent storage 505 for access and/or execution by one or more of the respective processor(s) 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., delivery component 111) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., delivery component 111) used to practice embodiments of the present invention can be stored on such portable computer readable storage media and can be loaded onto persistent storage 505 via I/O interface(s) 506. I/O interface(s) 506 also connect to display 510.

Display 510 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for routing one or more packages and delivering the one or more packages into one or more storage space belonging to one or more autonomous vehicles from a location of one or more vendors, the computer-implemented method comprising:
   receiving, by one or more vendors, an order request from one or more customers, wherein the order request comprise, one or more items and identifying information of the one or more autonomous vehicles;
   verifying available inventory of requested items by the one or more vendors;
   receiving status of the requested items from the one or more vendors;
   retrieving the requested items and placing the requested items into one or more packages;
   receiving vehicle status from the one or more autonomous vehicles;
   receiving a parking location from the one or more autonomous vehicles;
   receiving status from one or more automated delivery units, wherein the one or more automated delivery units is a plurality of robotic units with robotic arms and travels a long one or more paths from the one or more vendors to the parking location, wherein first path of one or more automated delivery paths is a path along an overhead rail track, above and parallel to the parking location;
   determining an optimal routing path for the requested items based on the order request, status from a first automated delivery unit of the one or more automated delivery units, the parking location and the vehicle status, wherein the first automated delivery unit of the one or more automated delivery units, further comprises:
      a first robotic delivery unit that travels along the first path of one or more automated delivery paths; and
      a trunk of the one or more autonomous vehicle that is accessible by the first robotic delivery unit, wherein and the trunk contains the one or more storage space for storing the one or more packages; and
   executing the optimal routing path by instructing the one or more autonomous vehicle to park in a designated parking spot and the one or more automated delivery units to deliver the one or more packages to the designated parking spot.

2. The computer-implemented method of claim 1, wherein the package status further comprises of, a status that the one or more packages is ready to be routed, a dimension and weight of the one or more packages or a status that the one or more packages is not ready.

3. The computer-implemented method of claim 1, wherein the vehicle status further comprises of, 1) current vehicle location of the one or more autonomous vehicles, 2) vehicle storage compartment availability of the one or more autonomous vehicles and 3) location and transit time of the one or more autonomous vehicles to a location of the one or more vendors.

4. The computer-implemented method of claim 1, wherein the status of first automated delivery unit of the one or more automated delivery units further comprises of, 1) availability of automated delivery unit, 2) current path and time of completion of other unavailable automated delivery unit, 3) location of available automated delivery unit and 4) type of available automated delivery unit.

5. The computer-implemented method of claim 1, wherein the order request further comprises of, 1) requested items to be placed into one or more packages including dimension and weight of items and 2) availability of requested items at the location of the one or more vendors.

6. The computer-implemented method of claim 1, wherein the optimal routing path further comprises of, 1) shortest path for items to be delivered to the one or more autonomous vehicles and 2) utilizing several routes and the one or more automated delivery units.

7. The computer-implemented method of claim 1, wherein a second automated delivery unit of the one or more automated delivery units further comprising:
   movable platform comprises a robotic arm, wherein the robotic arm can load and unload the one or more packages into the one or more storage space.

8. The computer-implemented method of claim 1, wherein outputting the optimal routing path further comprising:
   retrieving, by the first automated delivery unit of the one or more automated delivery units, the one or more packages from the location of the one or more vendors;
   instructing the one or more autonomous vehicles to park in a particular spot along a path that is serviced by the first automated delivery unit; and
   instructing the first automated delivery unit to load the one or more packages into the one or more autonomous vehicles that is parked in the particular spot.

9. A system for routing one or more packages and delivering one or more packages into one or more storage space belonging to one or more autonomous vehicles from a location of the one or more vendors, the system comprising:
   one or more computer processors;
   one or more computer readable storage media having computer-readable program instructions stored on the one or more computer readable storage media for execution by at least one of the one or more computer processors, said program instructions executes a computer-implemented method comprising the steps of:
      receiving, by one or more vendors, an order request from one or more customers, wherein the order request comprise, one or more items and identifying information of the one or more autonomous vehicles;
      verifying available inventory of requested items by the one or more vendors;
      receiving status of the requested items from the one or more vendors;
      retrieving the requested items and placing the requested items into one or more packages;
      receiving vehicle status from the one or more autonomous vehicles;
      receiving a parking location from the one or more autonomous vehicles;
      receiving status from one or more automated delivery units, wherein the one or more automated delivery units is a plurality of robotic units with robotic arms and travels a long one or more paths from the one or more vendors to the parking location, wherein a first path of one or more automated delivery paths is a path along an overhead rail track, above and parallel to the parking location;
      determining an optimal routing path for the requested items based on the order request, status from a first automated delivery unit of the one or more automated delivery units, the parking location and the vehicle status, wherein the first automated delivery unit of the one or more automated delivery units, further comprises:
  a first robotic delivery unit that travels along the first path of one or more automated delivery paths; and
  a trunk of the one or more autonomous vehicle that is accessible by the first robotic delivery unit, wherein and the trunk contains the one or more storage space for storing the one or more packages; and
executing the optimal routing path by instructing the one or more autonomous vehicle to park in a designated parking spot and the one or more automated delivery units to deliver the one or more packages to the designated parking spot.

10. The system of claim 9, wherein package the status further comprises of, a status that the one or more packages is ready to be routed, a dimension and weight of the one or more packages or a status that the one or more packages is not ready.

11. The system of claim 9, wherein the vehicle status further comprises of, 1) vehicle location of the one or more autonomous vehicles, 2) vehicle storage compartment availability of the one or more autonomous vehicles and 3) location and transit time of the one or more autonomous vehicles to a location of the one or more.

12. The system of claim 9, wherein the status of first automated delivery unit of the one or more automated delivery units further comprises of, 1) availability of automated delivery unit, 2) current path and time of completion of other unavailable automated delivery unit and 3) location of available automated delivery unit and type of available automated delivery unit.

13. The system of claim 9, wherein the order request further comprises of, 1) items to be placed into one or more packages including dimension and weight of items and 2) availability of items at the location of the one or more vendors.

14. The system of claim 9, wherein the optimal routing path further comprises of, 1) shortest path for items to be delivered to the one or more autonomous vehicles, 2) utilizing several routes and 3) the one or more automated delivery units.

15. The system of claim 9, wherein the first path of one or more automated delivery paths is a path along ground level which is underneath of the one or more autonomous vehicles.

16. The system of claim 9, wherein a second automated delivery unit of the one or more automated delivery units further comprising:
  movable platform comprises a robotic arm, wherein the robotic arm can load and unload the one or more packages into the one or more storage space.

17. The system of claim 9, wherein outputting the optimal routing path further comprising:
  retrieving, by the first automated delivery unit of the one or more automated delivery units, the one or more packages from the location of the one or more vendors;
  instructing the one or more autonomous vehicles to park in a particular spot along a path that is serviced by the automated delivery unit; and
  instructing the automated delivery unit to load the one or more packages into the one or more autonomous vehicles that is parked in the particular spot.

18. A computer program product for routing one or more packages and delivering the one or more packages into one or more storage space belonging to one or more autonomous vehicles from a location of the one or more vendors, the computer program product comprising:
  one or more computer readable storage media having computer-readable program instructions stored on the one or more computer readable storage media for execution by at least one of the one or more computer processors, said program instructions executes a computer-implemented method comprising the steps of:
    receiving, by one or more vendors, an order request from one or more customers, wherein the order request comprise, one or more items and identifying information of the one or more autonomous vehicles;
    verifying available inventory of requested items by the one or more vendors;
    receiving status of the requested items from the one or more vendors;
    retrieving the requested items and placing the requested items into one or more packages;
    receiving vehicle status from the one or more autonomous vehicles;
    receiving a parking location from the one or more autonomous vehicles;
    receiving status from one or more automated delivery units, wherein the one or more automated delivery units is a plurality of robotic units with robotic arms and travels a long one or more paths from the one or more vendors to the parking location, wherein a first path of one or more automated delivery paths is a path along an overhead rail track, above and parallel to the parking location;
    determining an optimal routing path for the requested items based on the order request, status from a first automated delivery unit of the one or more automated delivery units, the parking location and the vehicle status, wherein the first automated delivery unit of the one or more automated delivery units, further comprises:
      a first robotic delivery unit that travels along the first path of one or more automated delivery paths; and
      a trunk of the one or more autonomous vehicle that is accessible by the first robotic delivery unit, wherein and the trunk contains the one or more storage space for storing the one or more packages; and
    executing the optimal routing path by instructing the one or more autonomous vehicle to park in a designated parking spot and the one or more automated delivery units to deliver the one or more packages to the designated parking spot.

19. The computer program product of claim 18, wherein outputting the optimal routing path further comprising:
  retrieving, by the first automated delivery unit of the one or more automated delivery units, the one or more packages from the location of the one or more vendors;
  instructing the one or more autonomous vehicles to park in a particular spot along a path that is serviced by the automated delivery unit; and
  instructing the automated delivery unit to load the one or more packages into the one or more autonomous vehicles that is parked in the particular spot.

* * * * *